J. BERNET.
TRANSMISSION LEVER LOCK.
APPLICATION FILED MAY 17, 1916.
1,311,744.
Patented July 29, 1919.
2 SHEETS—SHEET 2.
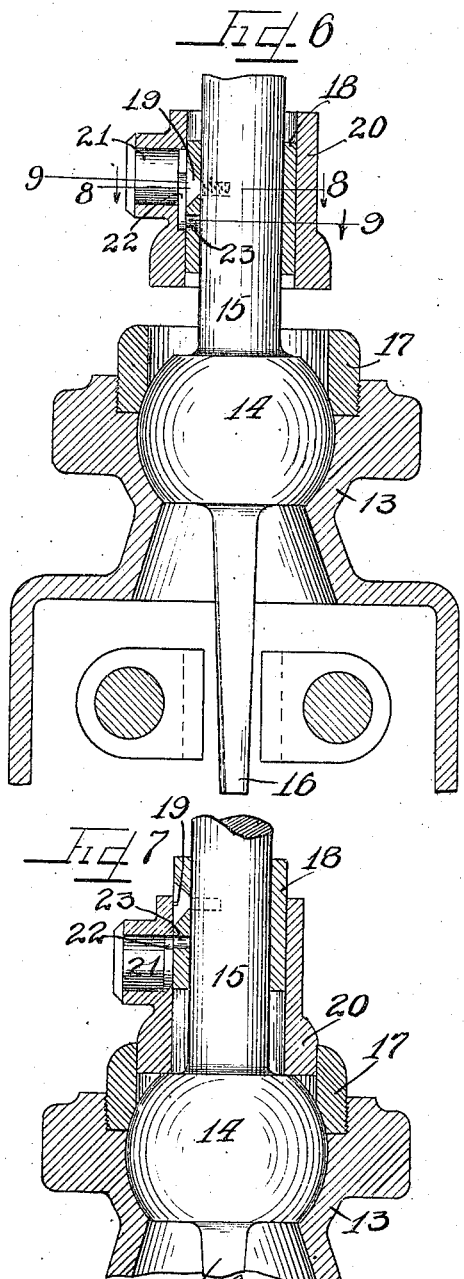
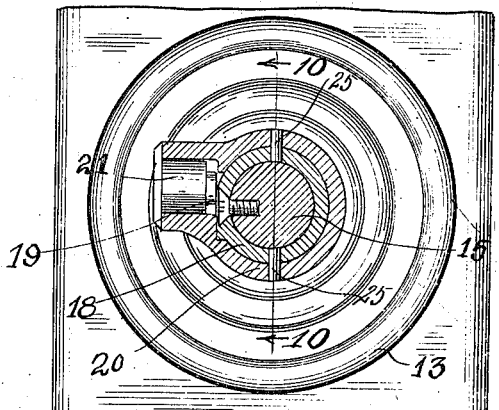
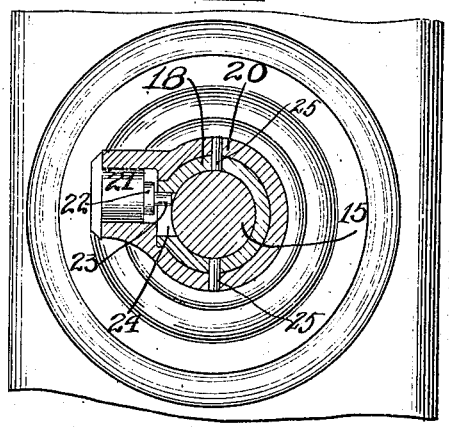
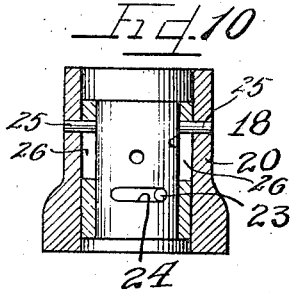
Inventor
John Bernet.

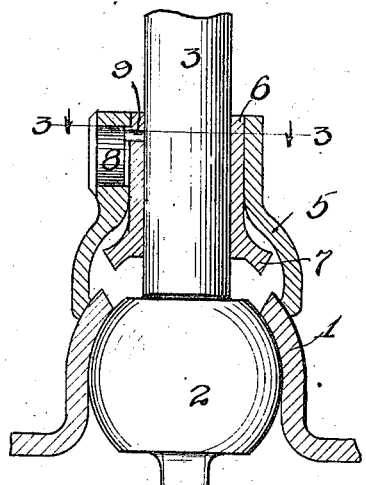
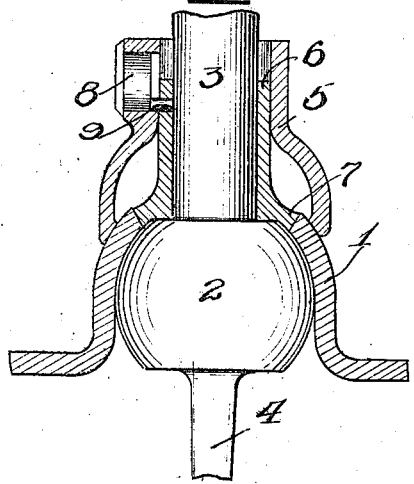
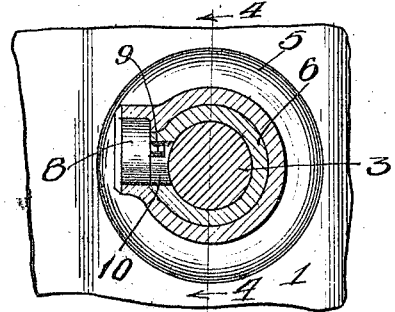
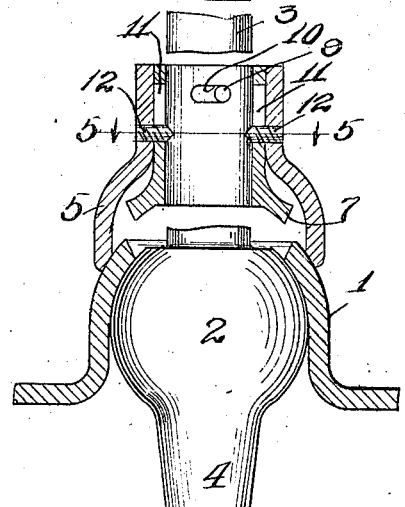
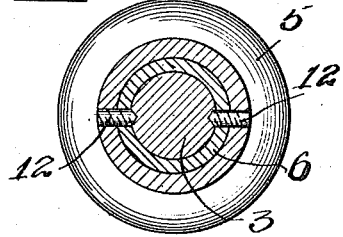

UNITED STATES PATENT OFFICE.

JOHN BERNET, OF CHICAGO, ILLINOIS, ASSIGNOR TO H.-R. MANUFACTURING COMPANY, OF CHICAGO, ILLINOIS, A CORPORATION OF ILLINOIS.

TRANSMISSION LEVER-LOCK.

1,311,744.      Specification of Letters Patent.      Patented July 29, 1919.

Application filed May 17, 1916. Serial No. 98,060.

*To all whom it may concern:*

Be it known that I, JOHN BERNET, a citizen of the United States, and a resident of the city of Chicago, in the county of Cook and State of Illinois, have invented certain new and useful Improvements in Transmission Lever-Locks; and I do hereby declare that the following is a full, clear, and exact description of the same, reference being had to the accompanying drawings, and to the numerals of reference marked thereon, which form a part of this specification.

This invention relates to an improved type of transmission lever lock particularly adapted for connection on the ball and socket type of gear shift lever in common use on motor cars. In using a ball and socket gear shift lever for shifting the gears of a transmission it is only necessary to rock the lever in any one of a number of certain directions of movement according to the shift desired, and a mechanism which operates to prevent such rocking movement of the gear shift lever serves effectually as a lock for the transmission.

It is an object therefore of this invention to construct a mechanism for association with the gear shift lever of a motor car transmission to lock the same from movement preferably in a neutral position to prevent shifting of the gears of the motor car.

It is also an object of this invention to construct a locking device for association with the gear shift lever of a ball and socket type of gear shift on a transmission to prevent actuation of the gear shift lever.

It is furthermore an important object of this invention to construct a locking device for connection on the gear shift lever of a transmission serving to lock the lever in neutral position and prevent actuation thereof to shift the gears of the transmission.

It is finally an object of this invention to construct a simple type of gear shift lever lock adapted to be readily connected for use upon the transmission without requiring changes in the structure of the transmission casing or connection of the lever thereto.

The invention (in a preferred form) is illustrated in the drawings and hereinafter more fully described.

In the drawings:

Figure 1 is a sectional detail view with parts in elevation of a lock embodying the principles of my invention associated with the gear shift lever, and shown in released position.

Fig. 2 is a similar view, illustrating the device in locking position.

Fig. 3 is a detail sectional view taken on line 3—3 of Fig. 1.

Fig. 4 is a sectional detail view taken on line 4—4 of Fig. 3.

Fig. 5 is a ional detail view taken on line 5—5 of Fig. 4.

Fig. 6 is a view similar to Fig. 1, of a modified form of device.

Fig. 7 is another similar view thereof, showing the device in locked position.

Fig. 8 is a detail sectional view taken on line 8—8 of Fig. 6, with parts shown in elevation.

Fig. 9 is a sectional detail view taken on line 9—9 of Fig. 6, with parts shown in elevation.

Fig. 10 is a detail sectional view taken on line 10—10 of Fig. 8, with parts omitted.

As shown in the drawings:

The reference numeral 1, indicates as a whole the socket member secured on or forming a part of a transmission gear casing, and oscillatably mounted therein and capable of universal movement is a ball element or member 2, formed on or secured to a gear shift lever 3, which extends upwardly therefrom and is provided with a downwardly extending tail portion 4. Resting adjustably upon the exterior of said socket member 1, is a bell shaped casing 5, through which the gear lever 3, extends, and slidably mounted within said casing 5, to slide upon said lever 3, is a sleeve 6, having an outwardly flaring head 7, at the lower end thereof, adapted when said sleeve is moved downwardly on said lever 3, to fit into the upper open end of the socket member 1, and thus prevent rocking movements of the gear lever therein. Accordingly, a lock 8, is mounted in one side of the casing 5, and secured on the rotatable cylinder thereof (not shown, but well known in this type of lock) is a pin 9, engaging in a horizontal slot 10, provided in said sleeve 6, whereby said sleeve is elevated and lowered according to the rotation of the lock cylinder by a key for the lock. Said sleeve 6, is also provided with a pair of vertical slots 11, on opposite sides thereof, and threaded into and through the bell shaped casing 5, are pins 12, which project through said slots 11, and engage into the gear lever 3, to prevent rotational movement of the sleeve 6, and to securely lock the casing 5, on the gear lever. The outer ends of said screws or pins 12, are filed away after the device is mounted upon the gear lever to prevent detachment of the locking mechanism therefrom. As clearly shown in Fig. 3, the sleeve 6, is not entirely cylindrical at the lock portion of the bell casing 5, and this serves further to prevent rotation of the sleeve 6, within the casing 5.

In the modified form of my invention illustrated in Figs. 6 to 10 inclusive, I have illustrated a socket member 13, secured on or formed integral with the cover of the transmission casing, and having oscillatably mounted therein the ball element 14, formed on or secured to a gear lever 15, and provided with a depending tail 16. A retaining collar 17, is threaded into the upper end of the socket member 13, and bears downwardly upon the upper portion of the ball element 14, to retain the same and said gear lever mounted in the socket member 13. Rigidly attached upon the gear lever 15, a slight distance above the collar 17, is a sleeve 18, secured to said lever 15, by means of a screw 19, and surrounding said sleeve 18, and slidable longitudinally thereon, is a sleeve casing 20. The exterior diameter of the lower end of the outer sleeve 20, is substantially the same as the interior diameter of the retaining collar 17, so that the lower end of said sleeve 20, may fit therein to lock the gear lever from movement.

For the purpose of actuating said outer sleeve 20, downwardly into locking position and retaining the same in such position, a lock 21, is mounted in one side thereof, the rotatable lock cylinder of which is provided with a crank 22, having a pin 23, mounted perpendicularly on the end thereof and slidably engaging a transverse or horizontal slot 24, in the stationary sleeve element 18, so that rotation of the lock cylinder will serve to slide said pinion in said slot 24; and at the same time move the outer sleeve casing 20, downwardly or upwardly, as the case may be. Guide pins 25, are threaded through the sleeve casing 20, and project inwardly engaging in longitudinal slots 26 in the sleeve 18, thus serving to guide the sleeve casing 20, in its movements and further prevent rotational movement of said sleeve casing.

The operation is as follows:

In the form of device illustrated in Figs. 1 to 5 inclusive, the inner sleeve element 6, with the enlarged flared head 7, at the lower end thereof is the locking element, and serves when lowered to engage within the upper open end of the socket casing 1, to prevent oscillating movements of the gear lever in its ball and socket connection, thus locking the same in neutral position. The actuation of the sleeve 6, is effected by insertion of a key into the lock 8, whereby the rotatable cylinder of the lock is caused to move and with it the pin 9, rigid on said cylinder to raise and lower said sleeve 6, said pin 9, sliding in the transverse slot 10, in said sleeve when such movement takes place. The pins 12, threaded inwardly through apertures provided in the bell casing 5, serve to secure the same rigidly upon the gear shift lever 3, and as well afford a guiding means for the movable sleeve 6, to prevent the same rotating upon the gear shift lever 3.

In the modified form of my invention illustrated in Figs. 6 to 10 inclusive, I have shown a slidable sleeve casing 20, adapted to be moved downwardly by actuation of the lock 21, into engagement with the retaining collar 17, by which the ball member 14, of the lever is held in engagement with the socket member 13, thereby preventing shifting movements of the lever.

I am aware that various details of construction may be varied through a wide range without departing from the principles of this invention, and I therefore do not purpose limiting the patent granted otherwise than necessitated by the prior art.

I claim as my invention:

1. In a device of the class described, a control lever, a support therefor, means slidable, in part, on the control lever for engagement with the support for locking the control lever, said means comprising a sleeve secured to the control lever, and another sleeve movable with respect to said first sleeve, and means for locking said second sleeve in locked position.

2. A gear shift lever lock of the class described comprising the combination with the ball and socket connection of the gear shift lever, of means slidable, in part, upon the gear shift lever for engagement with the socket member to lock the gear shift lever from movement comprising a sleeve secured to the lever and another sleeve movable with respect to said first sleeve and lever into interlocking engagement with the socket means to prevent shifting of the lever therein.

3. A locking device of the class described for use in combination with the ball and socket joint of a gear shift lever comprising means rigidly associated with the gear shift lever and surrounding the same, movable mechanism associated with said means also surrounding the gear shift lever, and key operated mechanism for moving said movable mechanism into engagement with said socket member, said socket member being adapted to receive said mechanism moved into engagement therewith to prevent actuation of the lever.

4. A lock of the class described comprising the combination with a gear shift lever and ball and socket connection thereof, of means restricted to longitudinal movement on said lever adapted to be moved into interlocking engagement with the socket member of the ball and socket connection, key operated means engaging said means for actuating and retaining the same in locked and unlocked position, a support for said key operated means connected to said lever and inclosing said longitudinally movable means to prevent access thereto.

5. In a locking device of the class described for use in combination with the ball and socket joint of a gear shift lever, a sleeve slidably mounted on said lever, a casing surrounding the same, and key operated means thereon for operating said sleeve into locking engagement with the socket member.

6. In a locking device of the class described for use with a gear shift lever, interfitting members mounted on said lever, locking means on one of said members adapted to actuate the other of said members into locking position to prevent shifting of the lever, the locking member being inclosed within the other member in order to prevent access thereto.

7. A lock for controlling levers, comprising a mounting for the transmission provided in its upper end with a socket, a non-slidable casing on the control lever, provided with means at its lower end to frictionally coöperate with the upper end of said mounting, a locking element vertically slidable in said casing and designed to operate with the socket in said housing when the control lever is in locked position.

8. A lock for controlling levers, comprising a retaining ring acting as a housing for the transmission, a non-slidable casing on the control lever provided with means to coöperate with the upper end of the retaining ring to form a dust cap for the transmission, and a vertically slidable locking element in the casing adapted to coöperate with the retaining ring for holding the lever in locked position when moved to locking position.

9. A lock for controlling levers comprising a mounting for the control lever having a socket in its upper end, a non-slidable casing on the control lever, provided with integral means at its lower end designed to coöperate with said mounting for forming a dust cap for the transmission, a vertically slidable locking element in the casing, and means for moving said locking element to locking position when the control lever is in locked position.

10. A lock for controlling levers, comprising a retaining ring provided in its upper end with a socket, and at its upper edge with a bearing, a non-slidable casing on the control lever, provided with an integral flange adapted to coöperate with the bearing on the retaining ring for forming a housing and dust cap for the transmission, a vertically slidable locking element in the casing, and means for moving said locking element to locked position when the control lever is in locked position.

11. A locking mechanism comprising in combination, a movable lever, a fixed socket, a casing fixed to the lever, a movable sleeve adjacent to the fixed socket and said casing for securing the lever against movement relative to the socket when in one position of its movement and permitting movement of the lever when in another position of its movement.

12. A locking mechanism comprising in combination, a movable lever, a fixed socket, a casing fixed to the lever, a movable sleeve adjacent to the fixed socket and said casing for securing the lever against movement relative to the socket when in one position of its movement and permitting movement of the lever when in another position of its movement, and means for locking said sleeve when it is in position for securing the lever against movement relative to the socket.

13. A locking mechanism comprising in combination, a movable lever, a fixed socket, a casing fixed to the lever, a movable sleeve adjacent to the fixed socket and said casing for securing the lever against movement relative to the socket when in one position of its movement and permitting movement of the lever when in another position of its movement, and key controlled means for locking said sleeve when it is in position for securing the lever against movement relative to the socket.

14. In a device of the class described, a control lever, a stationary socket, a casing fixed upon said lever and surrounding the same to move therewith, a sleeve slidable relative to said lever, socket and casing for locking the lever against movement when the sleeve is moved longitudinally in one direction.

15. In a device of the class described, a control lever, a stationary socket, a casing fixed upon said lever to move therewith, the interior of said casing forming a second socket spaced from the first mentioned socket, a sleeve slidable with relation to said lever, and mounted for longitudinal movement between said sockets, said sleeve engaging both of said sockets when in locking position, whereby said lever is locked against movement.

16. In a device of the class described, a control lever, a fixed socket, a casing fixed upon said lever to move therewith, the interior of said casing forming a second socket spaced from the first mentioned socket, a sleeve slidable with relation to said lever, and mounted for longitudinal movement between said sockets, said sleeve engaging both of said sockets when moved into locking position, whereby said lever is locked against movement, and means for moving said sleeve into locking position.

In testimony whereof I have hereunto subscribed my name in the presence of two subscribing witnesses.

JOHN BERNET.

Witnesses:
CHARLES W. HILLS, Jr.,
EARL M. HARDINE.